(No Model.)
F. CLEMENS.
CORN PLANTER.
No. 315,245.  Patented Apr. 7, 1885.
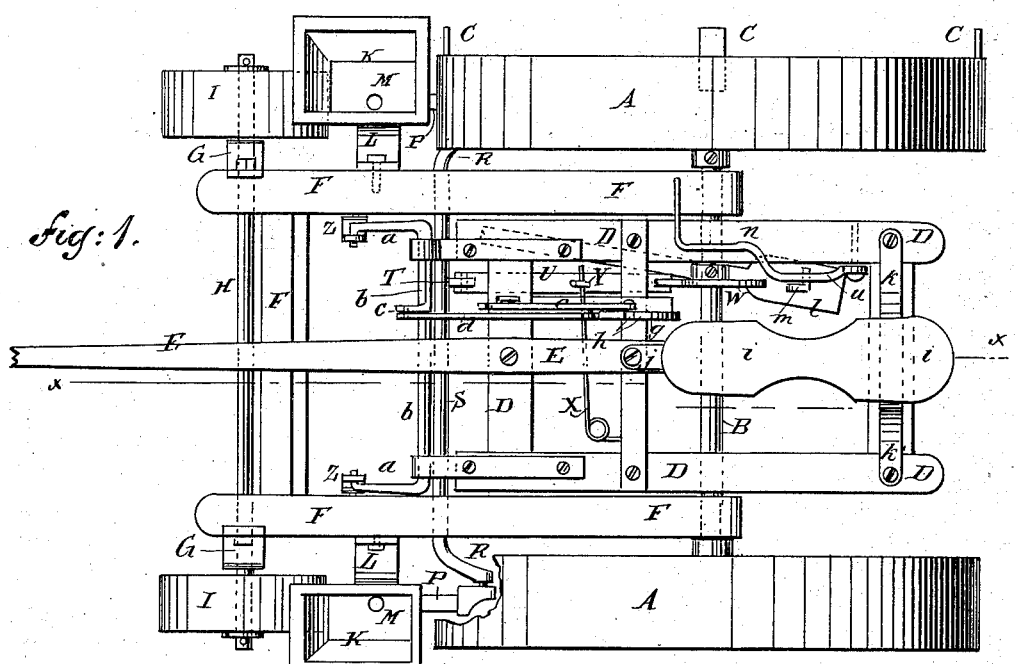
Fig: 1.
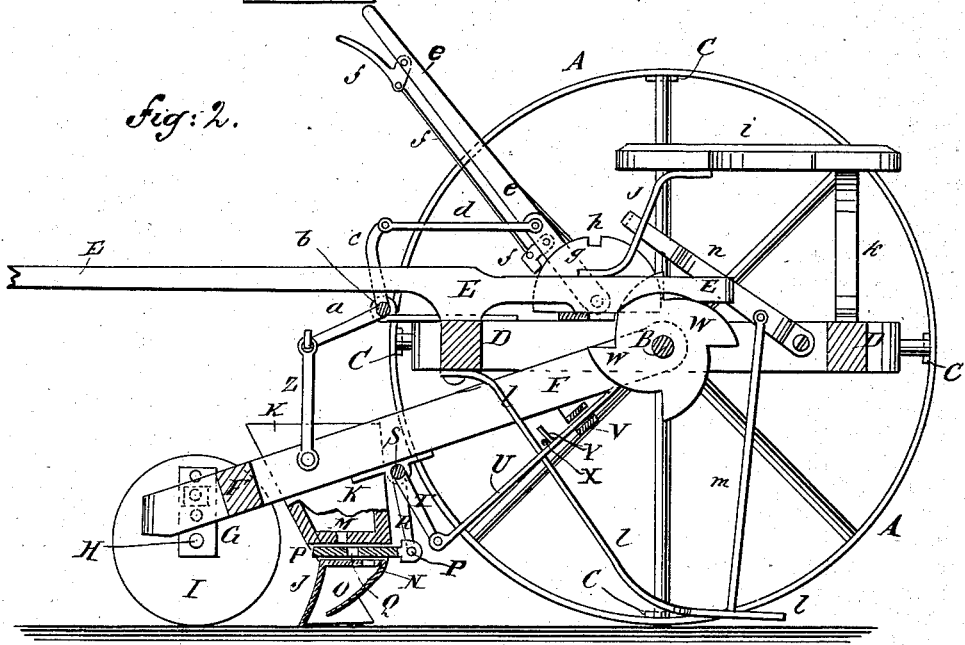
Fig: 2.
WITNESSES:  
Chas. Nida  
C. Sedgwick
INVENTOR:  
F. Clemens  
BY Munn & Co  
ATTORNEYS.

UNITED STATES PATENT OFFICE.

FERDINAND CLEMENS, OF WHAT CHEER, IOWA.

CORN-PLANTER.

SPECIFICATION forming part of Letters Patent No. 315,245, dated April 7, 1885.

Application filed August 29, 1884. (No model.)

*To all whom it may concern:*

Be it known that I, FERDINAND CLEMENS, of What Cheer, in the county of Keokuk and State of Iowa, have invented a new and useful Improvement in Corn-Planters, of which the following is a full, clear, and exact description.

Reference is to be had to the accompanying drawings, forming part of this specification, in which similar letters of reference indicate corresponding parts in both the figures.

Figure 1 is a plan view of my improvement, part being broken away. Fig. 2 is a sectional side elevation of the same, taken through the broken line $x$ $x$, Fig. 1, and part being broken away.

The object of this invention is to facilitate the planting of corn and promote convenience in controlling and operating corn-planters.

My invention consists in a corn-planter constructed with the seed-dropping slides of the seed-boxes attached to a frame hinged to the axle, connected with the said axle by a rock-shaft having arms, a sliding bar and its holding-spring, and a cam-wheel, whereby the said seed-dropping slides will be operated by the revolution of the said axle and its wheels. The hinged frame is connected with the main frame by a rock-shaft having arms, connecting-rods, a lever-pawl, and a catch-plate having a single recess, whereby the said hinged frame can be readily raised from the ground and securely supported in a raised position. The main frame is provided with a spring-shoe connected by a rod with a foot-lever hinged to the main frame, whereby the rigid wheel can be readily raised from the ground for convenience in turning the machine. The furrow-opening plow is constructed with a flat apertured top for the passage of the seed, and provided with an inclined apron, whereby the seed will be guided to and scattered in the bottom of the furrow, as will be hereinafter fully described.

A are the drive-wheels, one of which is rigidly attached to the axle B, and the other runs loose upon the said axle. The wheels A are made with wide rims, so as to pulverize the soil and press it down upon the seed, and are designed to be made of such a size that one revolution will measure off the space of four hills.

To the rim of the rigid wheel A are attached at equal distances apart four laterally-projecting blocks, C, in such positions as to mark the ground opposite each hill planted. The axle B revolves in bearings at the middle parts of the side bars of the frame D, to the forward middle part of which the tongue E is attached. The axle B also revolves in bearings in the rear ends of the side bars of the frame F, which is thus hung from and hinged to the said axle.

To the forward ends of the side bars of the frame F are bolted the upper parts of hangers G, to the lower ends of which is attached a shaft, H.

Upon the ends of the shaft H revolve small wheels I, which carry the forward end of the frame F, and are made with wide rims to prevent them from sinking into the soil, and to cause them to pulverize and smooth the soil in front of the furrow-opening plows J. Several holes are formed in the hangers G to receive the fastening-bolts, so that the forward end of the frame can be readily adjusted higher or lower to regulate the depth to which the plows J enter the ground.

The plows J are secured to the seed-boxes K, which are secured to hangers L, attached to the side bars of the frame F, and provided with discharge-openings M in the forward parts of their bottoms. The plows J are made with flat tops, which have openings N in their rear parts for the passage of the seed, with double mold-boards, and with forwardly-inclined plates or aprons, O, in their upper rear parts to receive and scatter the seed as it falls from the openings N, and to cause the seed to reach the bottoms of the furrows close in the rear of the forward parts of the plows, so that the seed will be deposited before any soil can fall into the furrows, and will thus always be planted in moist soil. The seed-dropping slides P are placed in spaces formed to receive them between the flat tops of the plows J and the bottoms of the seed-boxes K, and have openings Q formed in them to receive seed from the openings M in the said seed-box bottoms and convey it to the openings N in the plow-tops.

To the rear ends of the seed-dropping slides P are hinged the lower ends of arms R, formed upon or attached to the shaft S, which rocks in bearings attached to the side bars of the frame F, and to which is attached or upon it is formed an arm, T. To the outer end of the arm T is hinged the lower end of the bar U, which slides in a guide-bearing in a bar, V, attached to the side bars of the frame F. The upper end of the sliding bar U rests against the face of the cam-wheel W, attached to the axle B, and which is made with four cams arranged at equal distances apart, as shown in Fig. 2. The bar U is held up against the cam-wheel W by the spring X, one end of which is attached to the bar V or frame F, and its other end rests against a pin, Y, or other stop attached to or formed upon the sliding bar U. By this construction, as the machine moves forward, the cams of the wheel W successively push the bar U downward, and thus rock the shaft S and push the seed-dropping slides P slowly forward, so that the openings Q will have time to become filled with seed. As the end of the sliding bar U reaches the shoulder of each cam of the wheel W, it is forced upward suddenly by the elasticity of the spring X, and causes the seed-dropping slides to move outward quickly, so that the seed will be jarred out of the openings Q of the said slides, and caused to fall with certainty through the openings N to the ground.

To the forward parts of the side bars of the frame F are hinged the lower ends of bars Z, the upper ends of which are hinged to the ends of arms $a$, formed upon or attached to the ends of the shaft $b$. The shaft $b$ rocks in bearings attached to the forward ends of the side bars of the frame D, and upon the said shaft is formed or to it is attached an arm, $c$, to the end of which is hinged the forward end of a connecting-rod, $d$. The other end of the connecting-rod $d$ is hinged to the lever $e$, which is hinged at its lower end to a support attached to the frame D. The lever $e$ is provided with a lever-pawl, $f$, the engaging end of which rests upon the curved edge of the catch-plate $g$, secured to a support attached to the frame D. With this construction the forward end of the hinged frame F can be raised from and lowered to the ground, by operating the lever $e$. When the lower end of the frame F is raised from the ground, the engaging end of the lever-pawl $f$ drops into a recess, $h$, formed in the edge of the catch-plate $g$, and locks the said frame in a raised position. When the lower end of the frame F is lowered to the ground, the engaging end of the lever-pawl $f$ rests and slides upon the smooth edge of the catch-plate $g$, so that the said frame F will be free to rock upon the axle B as the wheels I pass over the uneven surface of the ground.

$i$ is the driver's seat, the forward end of which is supported by a standard, $j$, attached to the rear part of the tongue E, and its rear end is supported by standards $k$, attached to the rear corners of the frame D.

The driver's seat $i$ is made long, so that the driver, by moving back upon the said seat, can cause his weight to balance the frame F when raised from the ground.

To the lower side of the forward corner of the frame D, next the rigid wheel A, is attached the upper end of the spring $l$, which is so formed that when left free its lower end will be a little above the ground. The lower end of the spring $l$ is made wide and flat, so as when lowered to the ground to serve as a shoe to support the rigid wheel A above the ground for convenience in turning the machine. To the rear part of the spring-shoe $l$ is attached the lower end of a connecting-rod, $m$, the upper end of which is hinged to the lever $n$. The rear end of the lever $n$ is hinged to the rear part of the side bar of the frame D, and its forward end has a foot-rest formed upon it, and projects into such a position that it can be readily reached and operated by the driver with his foot to lower the rear end of the spring $l$ to the ground and raise the rigid wheel A above the ground.

Having thus described my invention, what I claim as new, and desire to secure by Letters Patent, is—

1. In a corn-planter, the combination, with the wheels and axle A B, the hinged frame F, the seed-boxes K, and the seed-dropping slides P, of the rock-shaft S, having arms R and T, the sliding bar U, the spring X, and the cam-wheel W, substantially as herein shown and described, whereby the said seed-dropping slides will be operated by the revolution of the said wheels and axle, as set forth.

2. In a corn-planter, the combination, with the main frame D, of the spring-shoe $l$, with one end connected to the carrying-frame, and its lower end disposed contiguously and about horizontally with the ground, the connecting-rod $m$, and the foot-lever $n$, said rod having one end secured to the upper side of the horizontal part of the shoe, and its upper end connected to said lever inside of its fulcrum, substantially as herein shown and described.

FERDINAND CLEMENS.

Witnesses:
REUBEN DAVIS,
JOHN C. JACKSON.